United States Patent
Nagarajan et al.

(10) Patent No.: US 9,811,487 B2
(45) Date of Patent: Nov. 7, 2017

(54) BACK CHANNEL SUPPORT FOR SYSTEMS WITH SPLIT LANE SWAP

(71) Applicant: CISCO TECHNOLOGY, INC., San Jose, CA (US)

(72) Inventors: Srividhya Nagarajan, San Jose, CA (US); Wei-Min Cheng, Cupertino, CA (US); Lalit Kumar, Fremont, CA (US); Deepak S. Mayya, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 235 days.

(21) Appl. No.: 13/935,172

(22) Filed: Jul. 3, 2013

(65) Prior Publication Data
US 2015/0012677 A1  Jan. 8, 2015

(51) Int. Cl.
*H04B 3/00* (2006.01)
*H04L 25/00* (2006.01)
*G06F 13/40* (2006.01)
*G06F 13/37* (2006.01)
*H04L 25/14* (2006.01)

(52) U.S. Cl.
CPC .......... *G06F 13/4022* (2013.01); *G06F 13/37* (2013.01); *H04L 25/14* (2013.01)

(58) Field of Classification Search
CPC ............. H04L 25/0272; H04L 25/0292; H04L 25/028; H04L 25/08; H04L 7/0008
USPC ........................................................ 375/257
See application file for complete search history.

(56) References Cited

U.S. PATENT DOCUMENTS

| | | | |
|---|---|---|---|
| 6,614,796 B1 * | 9/2003 | Black et al. | 370/403 |
| 8,218,537 B1 * | 7/2012 | Gui et al. | 370/369 |
| 2008/0201756 A1 * | 8/2008 | Shakiba et al. | 725/119 |
| 2010/0266006 A1 * | 10/2010 | Werner et al. | 375/232 |

OTHER PUBLICATIONS

IEEE Standards Information Network/IEEE Press: "IEEE 100: The Authoritative Dictionary of IEEE Standards Terms," Institute of Electrical and Electronics Engineers (IEEE); 7 edition; Dec. 1, 2000; p. 266.*
IEEE, "IEEE Standard for Information Technology—Telecommunications and information exchange between systems—Local and metropolitan area networks—Specific requirements: Part 3: Carrier Sense Multiple Access with Collision Detection (CSMA/CD) Access Method and Physical Layer Specifications—Amendment 4: Ethernet Operation over Electrical Backplanes," IEEE Computer Society, May 22, 2007, 195 pages.

* cited by examiner

*Primary Examiner* — Nader Bolourchi
(74) *Attorney, Agent, or Firm* — Polsinelli PC

(57) ABSTRACT

Example embodiments may include a method for configuring an interface that includes determining information for a configuration of an interface of a first device including a plurality of SERDES slices having a plurality of connections to a second device over the interface; and configuring a back channel layer associated with the first device to form a back channel path to carry a message between a transmitter and a receiver of the first device based on the configuration of the plurality of connections to the second device. The transmitter can be in a first SERDES slice of the plurality of SERDES slices and the receiver is in a second SERDES slice of the plurality of SERDES slices.

20 Claims, 9 Drawing Sheets

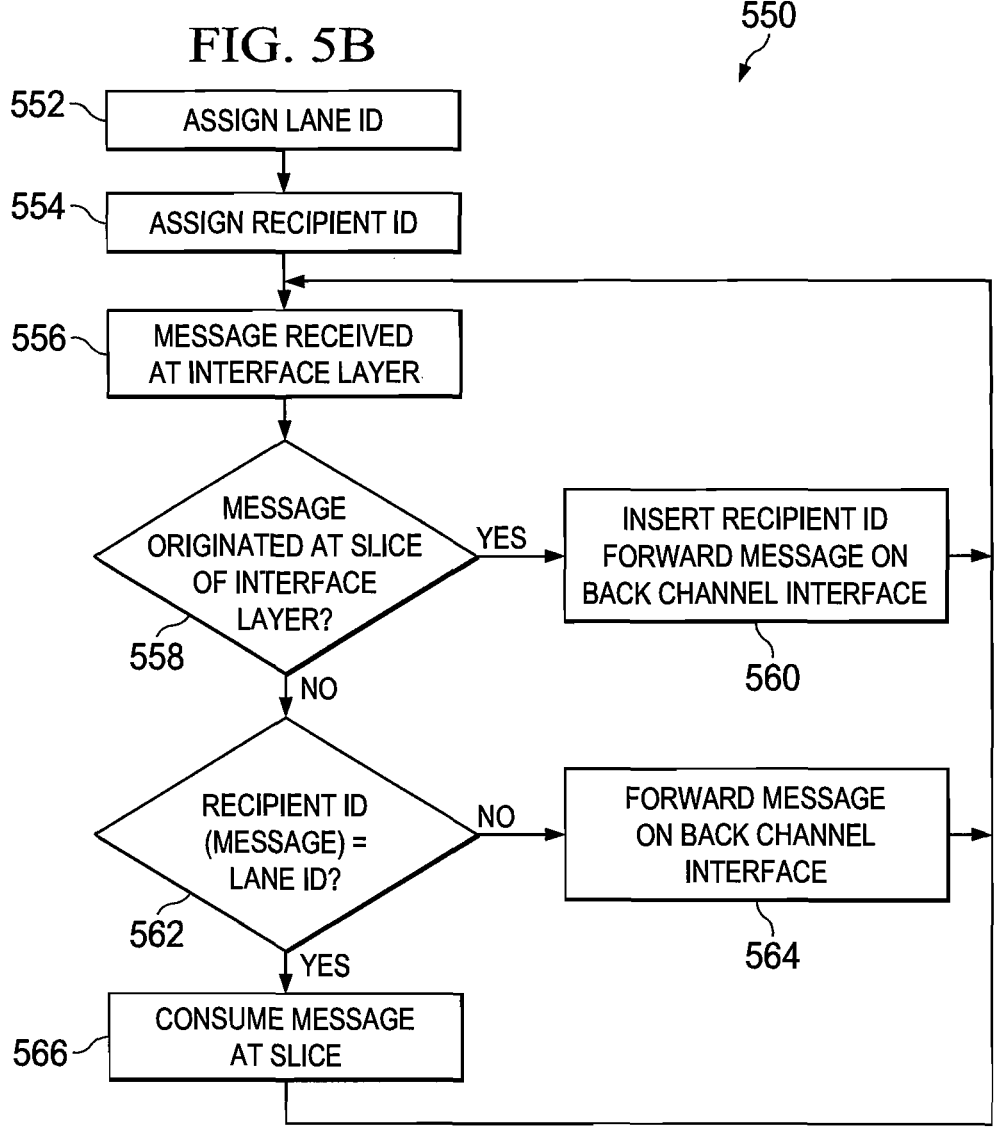

BACK CHANNEL SUPPORT FOR SYSTEMS WITH SPLIT LANE SWAP

TECHNICAL FIELD

This disclosure relates in general to communication networks and, more particularly, to a system and a method for back channel support in a serializer/deserializer (SERDES) interface with split lane swaps.

BACKGROUND

Communication networks generally function to move data from a source to a destination through a network of nodes interconnected by point to point links. The links may be bi-directional communication paths between two connected nodes within the network. Data may be transmitted in packets and routed through intermediate nodes (e.g., routers and switches from a source to a destination in the network). Routing protocols implemented within the nodes of a network allow one or more components, devices, or modules of the node to correctly direct data to its appropriate next destination.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5B is a simplified flow diagram illustrating example operations that may be associated a channel interface layer in accordance with another embodiment of the disclosure;

DETAILED DESCRIPTION OF EXAMPLE EMBODIMENTS

Overview

Figure 1:
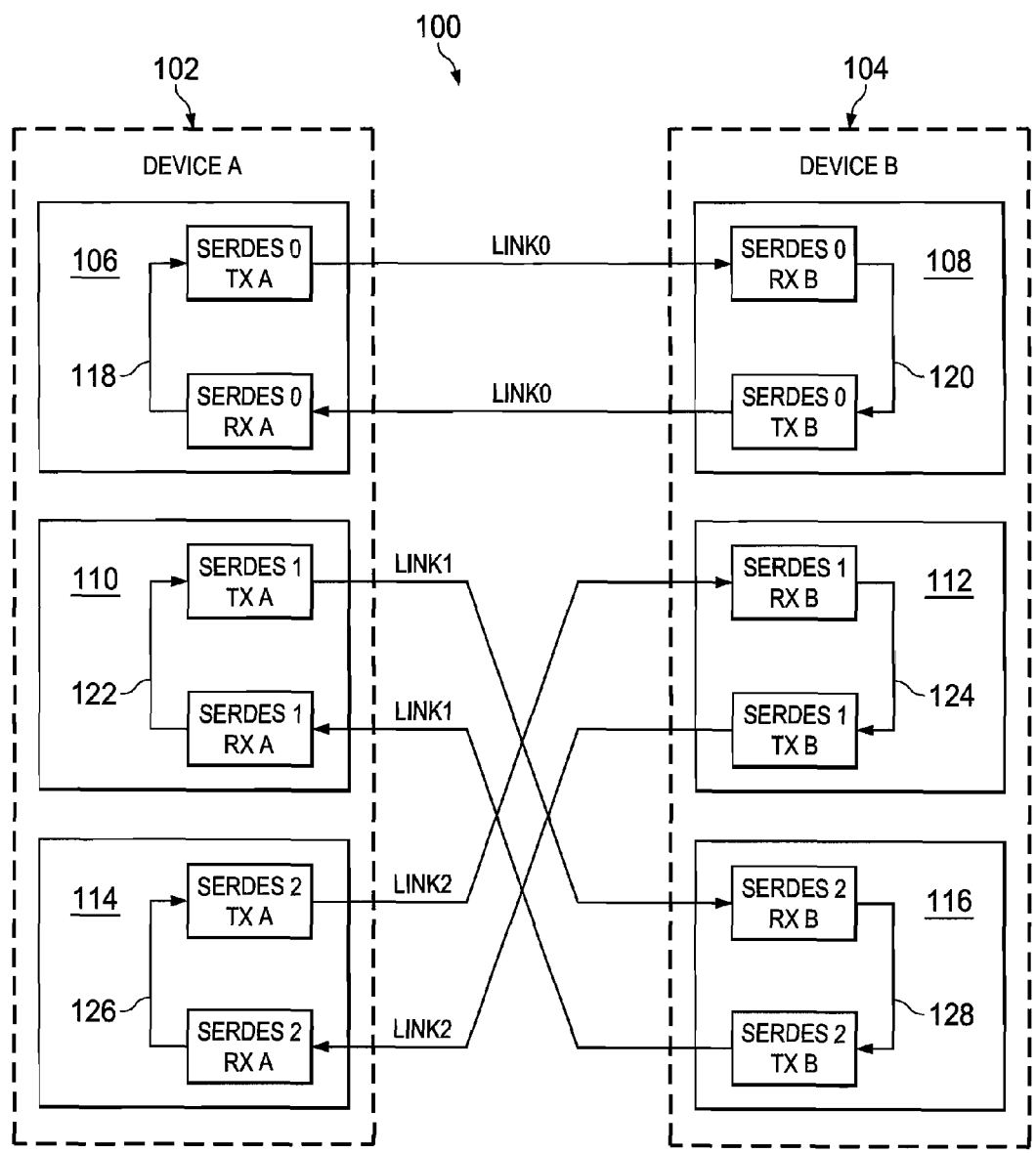
FIG. 1 is a simplified block diagram illustrating an example system.

According to example embodiments of the disclosure, a method for configuring an interface that includes determining (e.g., identifying, evaluating, analyzing, etc.) information for a configuration of an interface of a first device including a plurality of serializer/deserializer (SERDES) slices having a plurality of connections to a second device over the interface; and configuring a back channel layer associated with the first device to form a back channel path to carry a message between a transmitter and a receiver of the first device based on the configuration of the plurality of connections to the second device. The transmitter can be in a first SERDES slice of the plurality of SERDES slices and the receiver can be in a second SERDES slice of the plurality of SERDES slices.

Example Embodiments

Example embodiments of the present disclosure can provide a system and method for back channel support for systems with split lane swap implements a back channel mechanism for feedback information flow in a serializer/deserializer (SERDES) device. The system and method can provide feedback channels on a back channel layer between the transmitters and the receivers of the SERDES slices of the first device, and, provides feedback channels on a back channel layer between the transmitters and receivers of the SERDES slices of the second SERDES device, when the first and second SERDES devices are connected using one or more split lane swaps. The back channel layer may be any mechanism that allows feedback information to be conveyed between the SERDES slices. The example embodiments provide an advantage in that they are fully programmable and can be changed based on system and/or board configuration. The example embodiments can also be implemented independent of the SERDES device manufacturer and can be implemented for any back channel communications independent of any particular protocol.

In one example embodiment, the system and method may be implemented using a configurable mapping scheme in a back channel layer associated with a first SERDES interface device including a plurality SERDES slices communicating with a second SERDES interface device. The configurable mapping scheme provides a mapping layer that may be comprised of multiplexer devices. The multiplexer devices may be configured to allow a transmitter of any SERDES slice in the first SERDES interface device to be sent feedback command messages that are received by the receiver of any SERDES slice at the first interface device over the interface from the second SERDES device. The transmitter receiving the feedback command messages may then adjust its transmit settings according to the feedback command messages. The multiplexer devices may also be configured to allow the transmitter of any SERDES slice in the first SERDES device to be sent command and status data from the receiver of any SERDES slice in the first device and forward the command and status data to its link partner SEREDES slice in the second device. The implementation of the configurable mapping scheme allows the interface between the first and second SERDES devices to be routed using split lane swap connections.

In another example embodiment, the system and method may be implemented by a back channel bus in a back channel layer associated with a first SERDES device including a plurality SERDES slices communicating with a second SERDES device. The backchannel bus provides an interface layer that may be comprised of a daisy chained back channel bus. The daisy chained back channel bus may comprise a plurality of interface layers, each of which are associated with a SERDES slice in the first SERDES device. The daisy chained back channel bus may be configured to allow a transmitter of any SERDES slice in the first SERDES device to be sent feedback command messages that are received by the receiver of any SERDES slice in the first SERDES device over the interface from the second SERDES device. The transmitter may then adjust transmit settings according to the feedback command messages. The daisy chained back channel bus may also be configured to allow the transmitter of any SERDES slice in the first SERDES device to be sent command and status data from the receiver of any SERDES slice in the first SERDES device and forward the command and status data to its link partner SERDES slice in the second SERDES device. Each daisy chain back channel interface layer may be assigned a configurable Lane ID, which identifies the SERDES slice with which it is associated by software before the device is brought up. Each interface layer may also be assigned a Recipient Lane ID, which identifies a SERDES slice to which it should forward messages from the SERDES slice with which it is associated. If a feedback channel is contained within a SERDES slice, the Lane ID and the recipient Lane ID of the interface layer associated with that SERDES slice may both identify that SERDES slice. If a feedback channel is not contained within a SERDES slice, the Lane ID and the Recipient ID assigned to an interface layer and associated SERDES slice are different. When a backchannel message is received at a backchannel bus interface layer of a SERDES slice from a neighboring SERDES slice on the bus, the backchannel bus interface layer determines whether to receive the message or forward it on by comparing its Lane ID and the Recipient ID in the message. If the Lane ID and Recipient ID match, the back channel bus interface layer receives the message for its associated SERDES slice. When a backchannel message originates within a SERDES slice, the bus interface layer will forward the message on after inserting the appropriate Recipient ID. The implementation of the daisy chained back channel bus allows the interface between the first and second SERDES interface devices to be routed using split lane swap connections.

Note that a network node typically has input (ingress) ports and output (egress) ports and switching circuitry for switching packet traffic received on the ingress ports to the appropriate egress ports of the node. The network node may be configured, for example, to include a number of line cards configured on the input/output ports of the node where the line cards interface with one or more crossbar switches in the node. Each crossbar switch may have multiple interfaces and be configured to also interface with other crossbar switches and other components of the node. The configuration of the line cards and crossbar switches is implemented to allow routing of packet data traffic that is received at one input port of the node through the node to an appropriate output port of the node by switching the packet data traffic on appropriate paths.

The interfaces between the various components, including line cards and crossbar switches, of a networking node may be implemented as serial interfaces. The various components may receive packet data over the interfaces serially and then convert the packet data from serial to parallel data for processing and/or routing as necessary within the component. Each component then also may convert the processed and/or routed packet data from parallel to serial data when it is to be sent from the component over an interface. The interface may include multiple serial links as appropriate. The receiving and sending may be implemented within each component for each serial transmission channel using a serializer/deserializer (SERDES) device that performs the serial to parallel and the parallel to serial conversion of the packet data at the serial channels of the interface. A SERDES device in one component of the node, for example, a crossbar switch in an interface card, may communicate with a SERDES device in another component, for example, a crossbar switch in the routing fabric of a node, to implement a serial channel. A SERDES device may comprise a one or more transmitter/receiver pairs (SERDES slices).

The Institute of Electrical and Electronic Engineers (IEEE) standard 802.3ap, "Backplane Ethernet over Printed Circuit Boards" specifies aspects of serial interfaces that may be used in a network node. The 802.3ap standard was created to allow compatibility between components and devices that must interface with one another over serial interfaces such as the serial interfaces in a network node. Conformance to the standard is useful if components are manufactured by different manufacturers. The 802.3ap standard includes a back channel protocol specification that specifies mechanisms by which a transmitter in a SERDES slice in one device that transmits data to a receiver in a SERDES slice in a second device over a link may be tuned to optimize the signals for data transmission. In this mechanism, the receiver is able to provide feedback to the transmitter. The feedback is used to optimize transmit equalization in the transmitter settings to improve the signal quality as received at the SERDES receiver. The back channel protocol supports these mechanisms through the continuous exchange of fixed-length training frames. The training frame is a fixed length structure that is sent continuously during training. The training frame includes a control channel and training pattern. To achieve optimal signal quality on the link, the transmitter and receiver, which are the link partners over the serial link, have to exchange information that allows the transmitter to be tuned. The link partner transmitter and receiver also have to participate in the exchange of information, which allows the transmitter paired with the link partner receiver in the SERDES slice containing the receiver to be tuned.

Referring now to FIG. 1, therein is shown a simplified block diagram of an example SERDES interface 100. SERDES interface 100 includes device A 102 which interfaces with device B 104 over serial links, link2-link0. Device A includes SERDES slice 106, which is comprised of transmitter SERDES0 TXA, and receiver SERDES0 RXA, SERDES slice 110 which is comprised of transmitter SERDES1 TXA and receiver SERDES1 RXA, and SERDES slice 114 which is comprised of transmitter SERDES2 TXA and receiver, SERDES2 RXA. Similarly, device B includes SERDES slice 108, which is comprised of transmitter SERDES0 TXB and receiver SERDES0 RXB, SERDES slice 112 that is comprised of transmitter SERDES1 TXB and receiver SERDES1 RXB, and SERDES slice 116, which is comprised of transmitter SERDES2 TXB and receiver SERDES2 RXB. The feedback mechanism specified by the back channel protocol specification of 802.3ap utilizes the feedback channels 118-128 shown in each of the SERDES slices 106-116 of device A and device B to carry the feedback information for tuning each of the transmitters in device A and B. The back channel protocol specified in 802.3ap works when the transmit device and the receive device, device A and device B, are connected as shown in FIG. 1. For example, when SERDES slice 106 of device A is connected to SERDES slice 108 of device B, as shown in FIG. 1, feedback channels 118 and 120 function to provide a path for the feedback information to SERDES0 TXA and SERDES0 TXB, respectively. The feedback mechanism also functions when the links cross lanes and the lanes are swapped across SERDES link partners as is illustrated by the connection of SERDES slice 110 of device A to SERDES slice 116 of device B over link 1. In this case, feedback channels 122 and 128 function to provide a path for the feedback information to SERDES1 TXA and SERDES2 TXB, respectively. Lane swapping, as described above in connecting one SERDES slice in one device to one SERDES slice in another device not its link partner, is often used to efficiently utilize board real estate when routing connections between devices. With lane swapping, the same ASIC/logic that forms the feedback channels may be implemented with different SERDES boards having different lane swap configurations because the feedback channels carry feedback within a single SERDES slice.

In order to even further efficiently utilize board real estate, a routing technique known as a split lane swap could be used for more flexibility in routing. A split lane swap would involve splitting a SERDES slice in one device and connecting the SERDES slice to two different SERDES slices on another device. For example, if a split lane swap was implemented in which SERDES0 TXA of SERDES slice 106 was connected to SERDES0 RXB of SERDES slice 108 in FIG. 1, and SERDES1 RXA of SERDES slice 110 was connected to SERDES0 TXB of SERDES slice 108, in FIG. 1 a feedback channel for SERDES0 TXA would not exist. This is because the transmitter and receiver, SERDES0 TXA and SERDES1 RXA, are split across the lanes defined by slices 106 and 110 on device A and the feedback channel 118 cannot be utilized to provide feedback between SERDES1 RXA and SERDES0 TXA. Unlike routing limited to conventional lane swapping where the existing feedback channels can be used, routing using a split lane swap on an interface between two devices cannot be done if it is desired to use the feedback mechanism to tune the SERDES transmitters. Because the routing is not known beforehand, the feedback channels cannot be configured when the SERDES devices are manufactured. It would provide an advantage therefore to have a system and method for providing back channel support for systems with split lane swaps that overcame these problems and provided other advantages.

Figure 2:
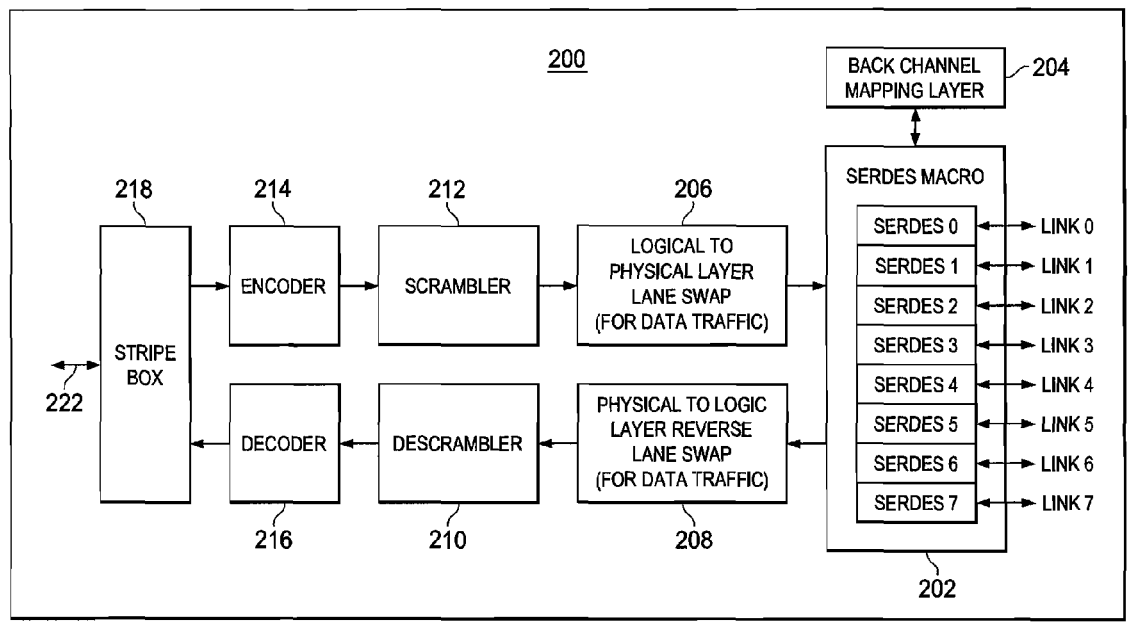
FIG. 2 is a simplified block diagram that illustrates an example implementation of a port/interface in accordance with an embodiment of the disclosure.

Referring now to FIG. 2, FIG. 2 is simplified block diagram illustrating an example implementation of a fabric port device 200 in accordance with an embodiment of the disclosure. FIG. 2 shows fabric port device 200 comprising Stripe Box 218, encoder 214, scrambler 212 logical to Physical Layer Lane Swap Block 206, Physical To Logic Layer Reverse Lane Swap Block 208, Descrambler 210 Decoder 216, SERDES Macro 202, Back Channel Mapping layer 204, and links (0-7). SERDES macro 202 comprises SERDES slices SERDES0-SERDES7. Each of link0-Link7 in FIG. 2 represents a link comprising a separate output and input link of each of SERDES0-SERDES7, respectively. Each of SERDES slices SERDES0-SERDES7 in SERDES Macro 202 may comprise a transmitter/receiver (Tx/Rx) pair, where the Tx transmits on the output link and the Rx receives on the input of link of the SERDES slice. For example, SERDES slice (0) comprises a Tx that transmits and a Rx that receives, respectively, on output link0 and input link0. While fabric port device 200 shows eight SERDES slices, SERDES0-SERDES7, a SERDES device according to the example embodiment may implement any number of SERDES slice. In operation, fabric port device 200 receives parallel data at input 222. The parallel data is encoded at encoder 214, scrambled by scrambler 212, the data traffic logical layer is mapped to the physical layer for lane swaps at block 206 and the data is input to SERDES Macro 202. SERDES macro 202 converts the parallel data to serial data and transmits the serial data on the serial outputs of Link0-Link7. Serial data received on the serial inputs of Link0-Link7 is converted to parallel data, the physical layer is mapped to the logical layer for reverse lane swap at block 208, the data is descrambled at descrambler 210, decoded at decoder 216, and output on bus 222 at stripe box 218. Back channel mapping layer 204 comprises circuitry, which may be for example, an application specific integrated circuit (ASIC), that according to an example embodiment of the disclosure is configurable to provide feedback channels between the transmitters and receivers of SERDE0-SERDES7. Back channel mapping layer 204 may be controlled and configured by control functions implemented in one or more processors or circuits, such as application specific circuits (ASICs), that may be implemented within hardware circuitry or software or, a combination of hardware and software, within fabric port device 200, or that may be implemented separately within the system in which fabric port device 200 is implemented. The control functions may also be distributed and shared between back channel mapping layer 204 and the one or more processors. The control and configuration of back channel mapping layer 204 may be done based on appropriate information determined about the configuration of the interface to which the input and output links, Link0-Link7, are connected. The control functions may determine the interface configuration information by any of various methods, including automated or manual methods. Determining as used in this disclosure includes operations of receiving, calculating, retrieving, etc, or any other way of conveying the configuration information. Configuring as used in this disclosure includes any method or implementation for creating feedback paths or channels on a back channel layer. The example implementation of fabric port device 200 may used to implement serial data transmission over interfaces to send to and receive data from other SERDES devices according to the embodiments of the disclosure.

Figure 3A:
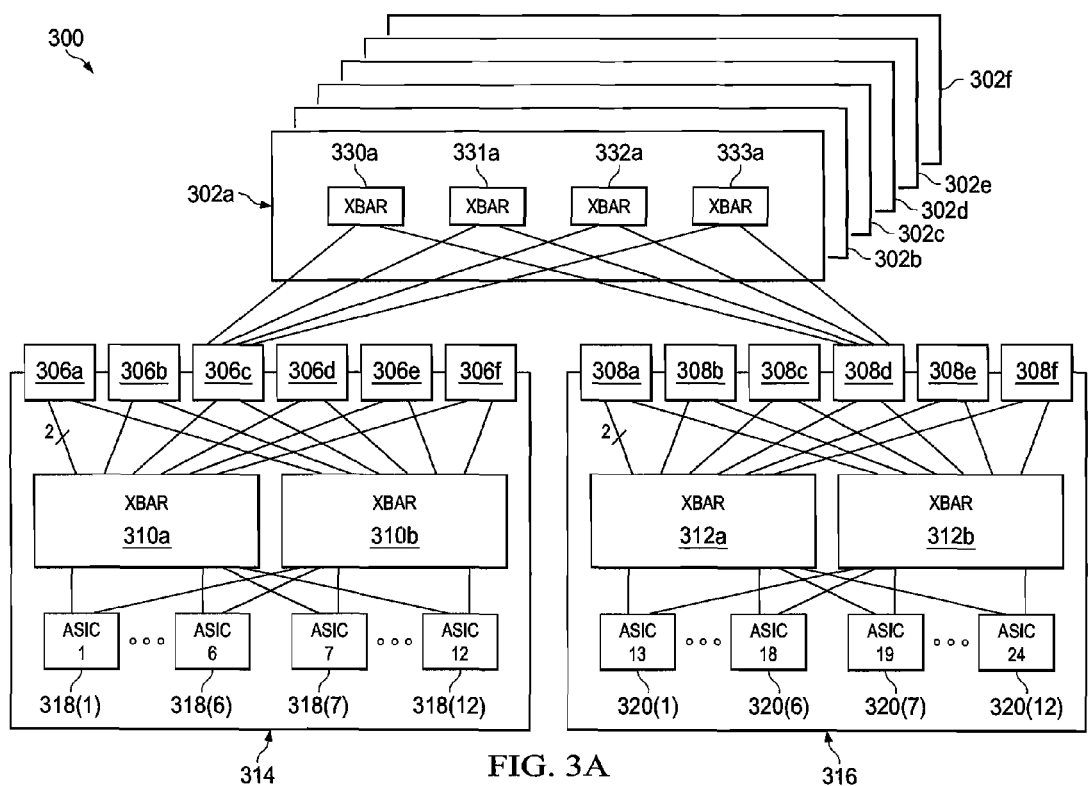
FIG. 3A is a simplified block diagram illustrating an example system into which an example embodiment of the disclosure may be implemented.
Figure 3B:
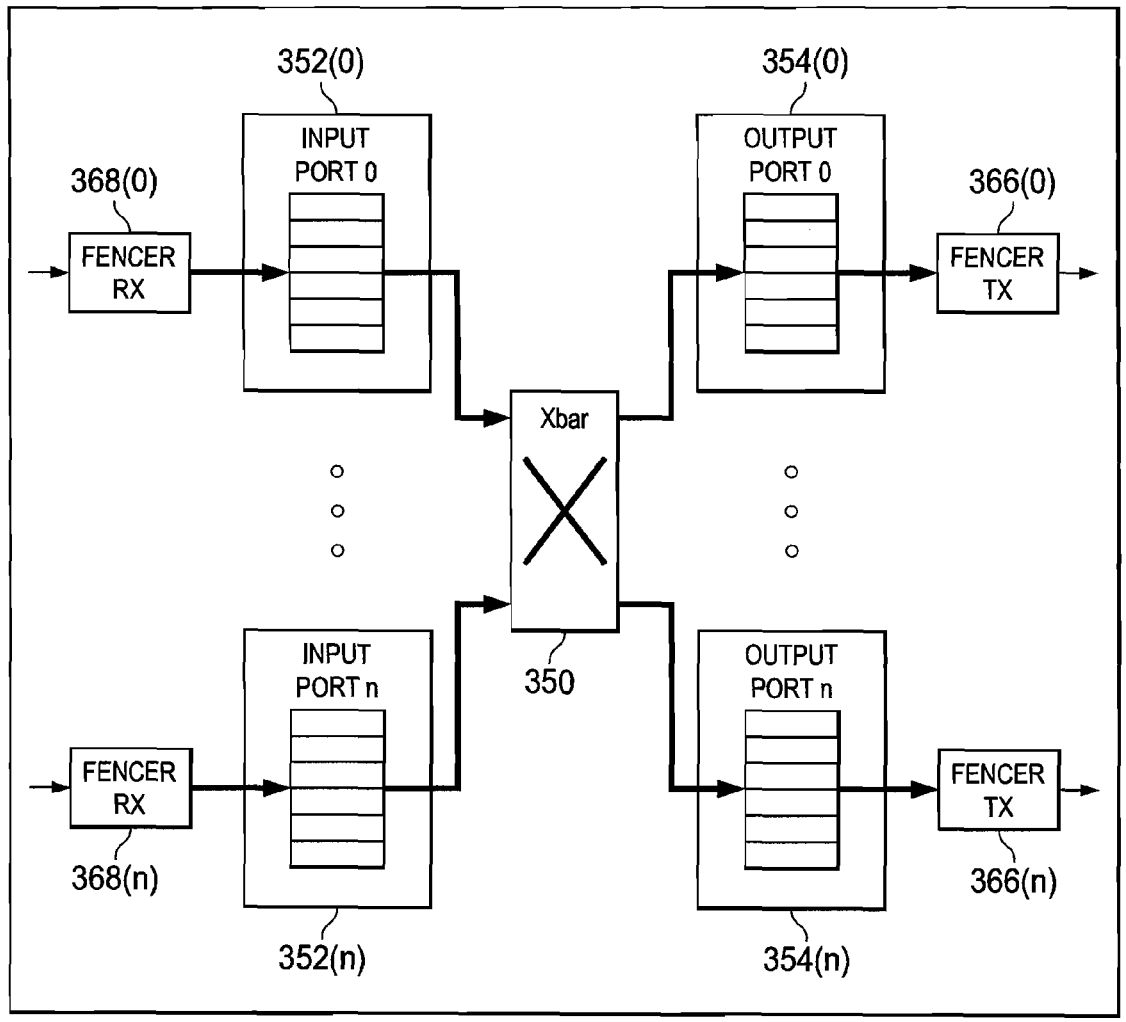
FIG. 3B is a simplified block diagram illustrating an example crossbar switch into which an example embodiment of the disclosure may be implemented.

Referring now to FIG. 3A, therein is illustrate a simplified block diagram of an example system 300 into which the example implementation of fabric port device 200 may be implemented. System 300 includes line cards 314 and 316, and spines 302a-302f. Line card 314 may be implemented to include application specific integrated circuits ASIC1-ASIC12, crossbar switches (XBARs) 310a and 310b, and connectors 306a-306f. Line card 316 may be implemented to include application specific integrated circuits ASIC13-ASIC24, crossbar switches (XBARs) 312a and 312b, and connectors 308a-308f. Spine 302a may be implemented to include XBARs 330a-333a. Each of the other spines may also be implemented to include corresponding XBARs. In an embodiment of the disclosure, serial interfaces between the ASIC1-ASIC12 and XBARs 310a and 310b, within the line card 314, and serial interfaces between ASIC13-ASIC24 and XBARs 312a and 312b, within line card 216, may be implemented using SERDES devices having back channel support for split lane swap such as fabric port device 200 of FIG. 2 configured within the appropriate components. The interfaces between spines 302a-302f and lines cards 314 and 316 may also be implemented using SERDES devices, such as SERDES device 200. For example, FIG. 3 shows the serial interfaces between XBARS 330a-333a of spine 302a and XBARs 310a, 310b, 312a and 312b of line cards 314 and 316, which may also be implemented using SERDES devices implemented such as fabric port 200 of FIG. 2. Each of the other spines 302b-302f has connections to corresponding xbars through connectors 308b-308f, respectively, in line cards 314 and 316. In operation system 300 receives data traffic on input ports connected to one of ASIC1-ASIC24. The data is then switched and routed through the line cards, XBAR switches and spines as necessary to route the data traffic to an appropriate output port which is connected to one of ASIC1-ASIC24. System 300 may be implemented as a node in a telecommunications network and function as a switch/router to receive and direct data traffic to and from other network nodes and devices to implement data transmission in the network. System 300 may be any type of router, switch or system that handles data traffic. In accordance with one example embodiment, for example, a switch such as Cisco® Nexus 7000 or MDS 9000 may be used to implement system 300. FIG. 3B illustrates a simplified block diagram of an example crossbar switch into which an example embodiment of the disclosure may be implemented. Crossbar switch 300 comprises switch portion 350, input ports 352(0)-352(n), output ports 354(0)-354(n) and SERDES TXs 366(0)-366(n), SERDES RXs 368(0)-368(n). A SERDES Device such as SERDES device 200 of the example embodiment of FIG. 2, may be used to implement the SERDES RX and TX for each input/output port pair. For example, input port 0 and output port 0 may be implemented using SERDES device 200 of FIG. 2 to provide the ability to allow split lane swap connections while supporting a back channel protocol for the SERDEs devices on the interface between the components of a system such as system 300.

Figure 4A:
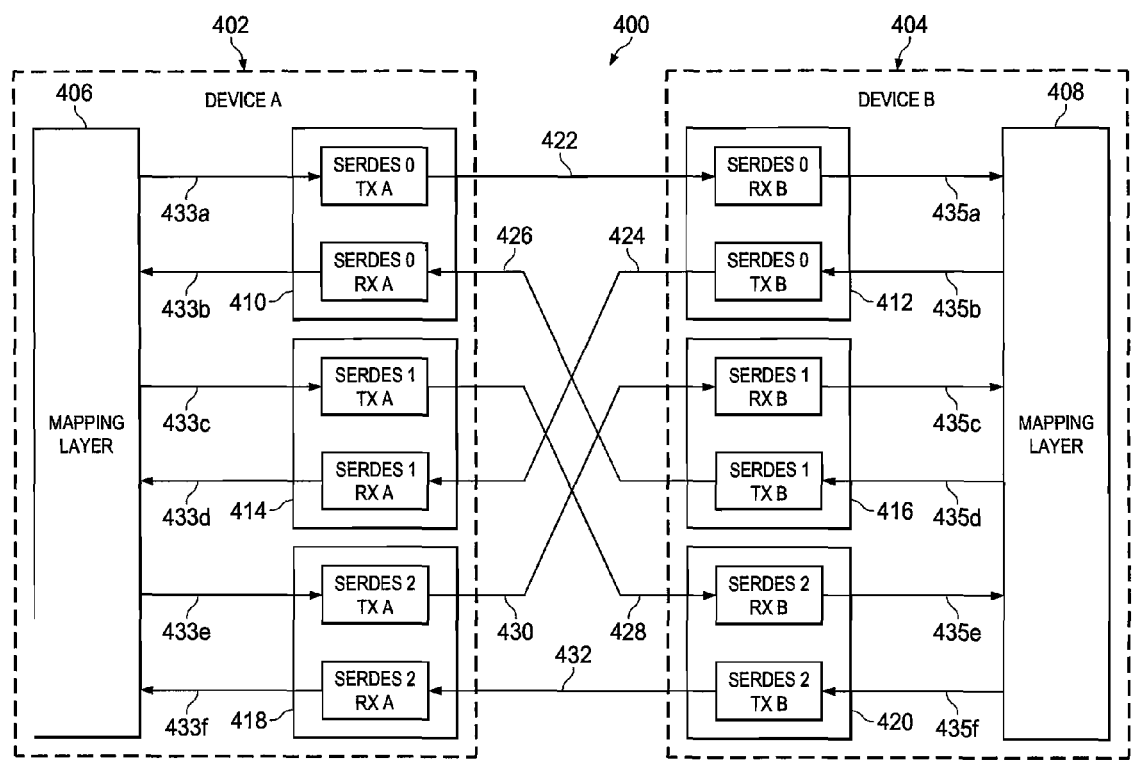
FIGS. 4A and 4B are simplified block diagrams illustrating an example implementation of a channel interface layer in accordance with an embodiment of the disclosure.
Figure 4B:
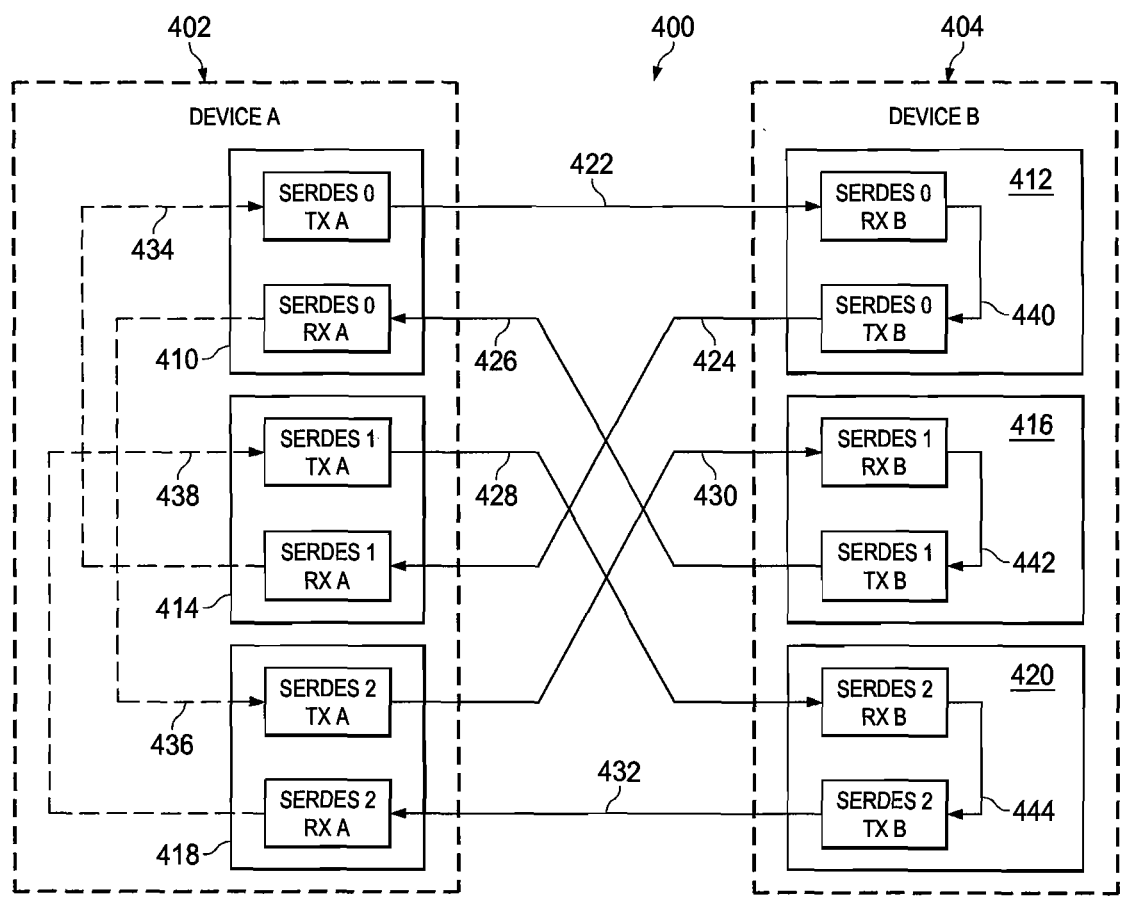

Referring now to FIGS. 4A and 4B, therein are illustrated simplified block diagrams illustrating an example implementation of a SERDES interface in accordance with an embodiment of the disclosure. FIGS. 4A and 4B illustrate an example embodiment of a SERDES interface 400 having SERDES devices, Device A 402 and Device B 404. Device A comprises SERDES slices 410, 414 and 418. Device B comprises SERDES slices 412, 416 and 420. In the example implementation, each of Device A and Device B may be implemented according to the example embodiment of SERDES device 200 of FIG. 2, with the exception that each SERDES device in FIGS. 4A and 4B is shown with three SERDES slices instead of eight. It will be understood that while the example implementation of FIGS. 4A and 4B shows three SERDES slices in each of Device A and Device B, SERDES devices, such as Device A and Device B, according to the disclosure may be implemented with any number of SERDES slices to form an interface such as shown in FIGS. 4A and 4B. The communication protocol used for the interface may be any suitable protocol such, for example, as 10G-KR, peripheral component interconnect express(PCIE)Generation 1, 2 or 3.

SERDES slice 410 of Device A includes transmitter SERDES0 TXA and receiver SERDES0 RXA, SERDES slice 414 includes transmitter SERDES1 TXA and receiver SERDES1 RXA, and SERDES slice 418 includes transmitter SERDES2 TXA and receiver SERDES 2 RXA. Similarly, in Device B, SERDES slice 412 includes transmitter SERDES0 TXB and receiver SERDES0 RXB, SERDES slice 416 includes transmitter SERDES1 TXB and receiver SERDES1 RXB, and SERDES slice 420 includes transmitter SERDES2 TXB and receiver SERDES2 RXB. Each of the SERDES slices sends and receives serial data. In the example embodiment, an interface may be configured by coupling the receivers and transmitters of the SERDES slices of Device A to the receivers and transmitters of the SERDES slices of Device B. Each of Device A and Device B also includes a back channel layer implemented as a Mapping Layer that is shown In FIG. 4A for each device, as Mapping Layer 406 and Mapping Layer 408, respectively. According to the example embodiment, the Mapping Layers 406 and 408 may be configured to provide programmable feedback channels for use in a back channel protocol mechanism for tuning the transmitters of the interface. FIG. 4B shows a possible configuration of programmed feedback channels 434, 436, 438 in mapping Layer 406 of Device A and feedback channels 440,442,444 on Mapping Layer 408 of Device B. Each feedback channel realizes a link to carry feedback messages across slices from an RX of one slice to a TX of another slice on the same device. For, example, feedback channel 434 carries feedback messages to SERDS0 TXA from SERDES1 RXA.

According to the example embodiment, the Mapping Layers 406 and 408 allow Device A and Device B to be configured with no constraints against using split lane swap connections across the interface 400. Each feedback channel may be configured after routing is completed and the interconnections between Devices A and B are known. In response to the requirements of a back channel protocol tuning process, the appropriate feedback channel connection can be configured.

For example, in FIGS. 4A and 4B, for slice 410, SERDES0 TXA transmits serial data to SERDES0 RXB on link 422 and SERDES0 RXA receives serial data from SERDES1 TXB on link 426. For slice 414 SERDES1 TXA transmits serial data to SERDES2 RXB on link 428 and SERDES1 RXA receives serial data from SERDES0 TXB on link 424. For Slice 418 SERDES2 TXA transmits serial data to SERDES1 RXB on link 430 and SERDES2 RXA receives serial data from SERDES2 TXB on link 432. For Device A, it can be seen that slice 410 is transmitting to slice 412 and receiving from a different slice 416 of Device B. Also, slice 414 on Device A is transmitting to slice 420 and receiving from a different slice 412 of Device B and slice 418 on Device A is transmitting to slice 416 and receiving from a different slice 420 of Device B. In the example of FIGURES A and B, there are then split lane swap connections for each slice in Device A.

Referring to FIG. 4B, in the example embodiment, the transmitter tuning process requires exchange of information. For example, in the equalization tuning process for SERDES0 TXA, SERDES0 TXA transmits a training frame that is a fixed length structure that is sent continuously during training. In response, SERDES0 RXB should send commands back to SERDES0 TXA to adjust its certain transmission parameters, for example, such as precursor, post-cursor, or amplitude. For example, SERDES0 RXB may need to tell SERDES0 TXA to increment, decrement or not change certain equalization parameters for the training frame transmission. SERDES0 TXA responds to the commands with status messages that may for example, indicate to SERDES0 RXB that the transmitter can still adjust certain parameters, that the transmitter has reached a high limit for certain parameter, or has reached a low limit for certain parameters. The training frame transmission and feedback is used to tune SERDES0 TXA and the other transmitters in each slice of FIGS. 4A and 4B. The conventional SERDES device that provides a feedback channel only between a receiver and transmitter within the same slice of a SERDES device would not function to allow tuning in the example embodiment of interface 400 of FIGUREs A and B having split lane swaps. The example implementations of Device A and Device B in interface 400 according to the embodiments of the disclosure allow the implementation of interface 400 including split lane swaps. In the embodiment of interface 400 of FIGS. 4A and 4B, the configurations of Mapping Layer 406 and Mapping Layer 408 may be implemented so that messages only should move between the slices of one of Device A or Device B. In other words, with the appropriate configuration of Mapping Layer 406 of Device A, the Mapping Layer 408 of Device B may be configured so that messages are sent from each receiver of a slice of Device B only to the transmitter in that same slice. For the example embodiment of FIGS. 4A and 4B, feedback channels 440, 442 and 444 may be implemented in Mapping Layer 408 so that the feedback channels carry feedback commands between the receiver and transmitter within each of slices 412, 416 and 420, respectively, while the Mapping layer 406 of Device A is configured with the feedback channels that carry messages between slices 410, 414 and 418. In alternative embodiments for example, this would require that only Device A have Mapping Layer configuration implemented and Device B could be implemented as a conventional device.

Referring again to FIG. 4B, the feedback channels 434, 436, 438 on mapping Layer 406 of Device A are configured to allow the required exchange of information and messages for the transmitter tuning process for each transmitter on the interface 400. For example, feedback channel 434 is configured in Mapping Layer 406 based on the connections between Device A and Device B on interface 400. In the tuning process of transmitter SERDES0 TXA, SERDES0 RXB receives a training pattern from SERDES0 TXA. Based on the received training pattern, SERDES0 RXB will return command messages to SERDES0 TXA through feedback channel 440 to SERDES0 TXB, which transmits the messages over link 424. The command messages are received by SERDES0 RXA on link 424. SERDES1 RXA then sends the command messages on feedback channel 434 to SERDES0 TXA. SERDES0 TXA can then transmit status messages in response to the command messages received from SERDES0 RXA and the tuning process can be performed for SERDES0 RXA.

Feedback channel 434 may also be used to carry command messages that SERDES1 RXA should send to SERDES0 TXB in the tuning process of SERDES0 TXB. In this case feedback channel 434 may be utilized carry the command messages to SERDES0 TXA which then transmits the command message originated at SERDES1 RXA over link 422 to SERDES0 RXB which relays the command messages over feedback channel 440 to SERDES0 TXB. During the tuning process SERDES0 TXB may transmit status messages to SERDES1 RXA over link 424. Similarly, feedback channel 436 of Mapping Layer 406 may be utilized in the tuning process of SERDES2 TXA and SERDES1 TXB and feedback channel 438 of Mapping Layer 406 may be utilized in the tuning process of SERDES1 TXA and SERDES2 TXB.

Mapping Layer 406 may comprise multiplexing circuitry that, for example, includes a multiplexer for each transmitter that is configurable to receive feedback command messages received on the interface 400 by any receiver in Device A. Mapping Layer 406 may also comprise a multiplexer for each transmitter that is configurable to receive command/status messages from any receiver in Device A directed to the receiver in the slice in which the transmitter is implemented. The multiplexing circuitry may be statically programmed by software based on the configuration of the interface 400 that is implemented. The software may program the configuration before the channels are brought up for transmitter tuning.

Figure 5A:
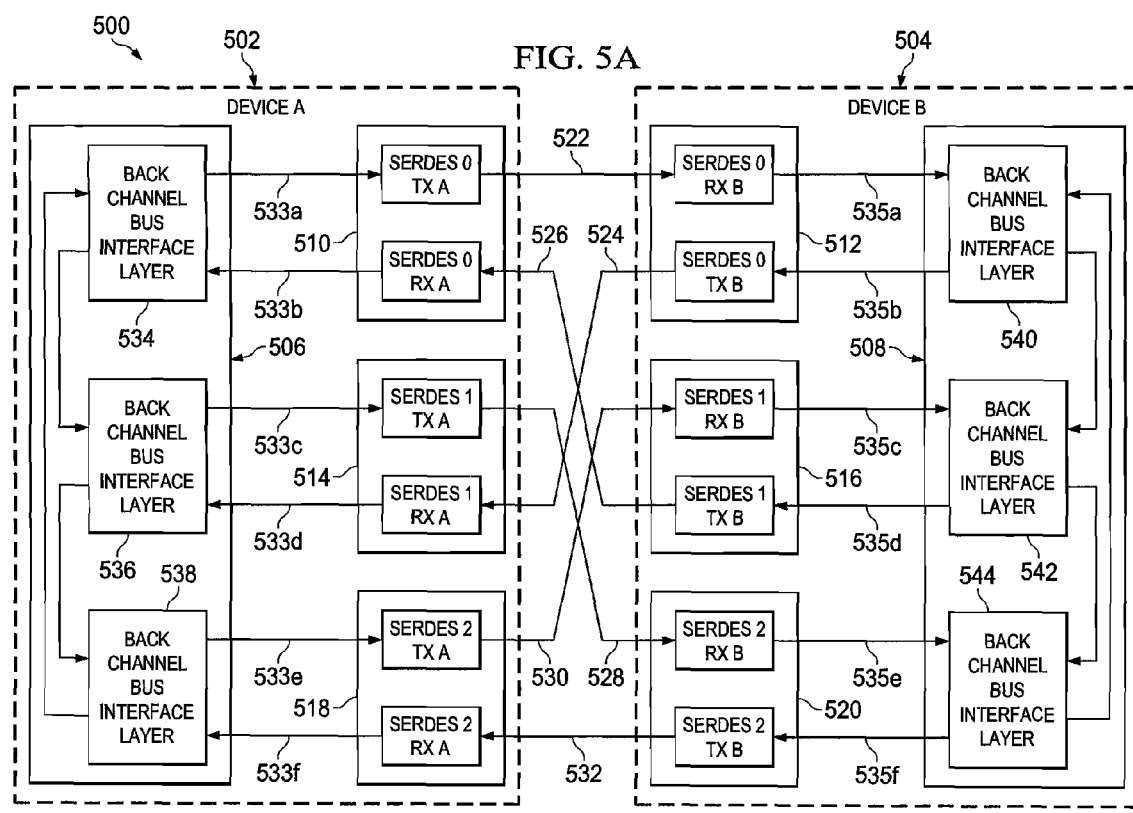
FIG. 5A is a simplified block diagram illustrating an example implementation of a channel interface layer in accordance with another embodiment of the disclosure.

Referring now to FIG. 5A, therein is a simplified block diagram illustrating an example implementation of a SERDES interface 500 in accordance with another embodiment of the disclosure. FIG. 5A illustrates an example embodiment of a SERDES interface 500 having SERDES devices, Device A 502 and Device B 504. Device A comprises SERDES slices 510, 514 and 518. Device B comprises SERDES slices 512, 516 and 520. In the example implementation, each of Device A and Device B may be implemented according to the example implementation of SERDES device 200 of FIG. 2, with the exception that each SERDES device in FIG. 5A is shown with three SERDES slices instead of eight. It will be understood that while the example implementation of FIG. 5A shows three SERDES slices in each of Device A and Device B, SERDES devices, such as Device A and Device B, according to the disclosure may be implemented having any number of SERDES slices to form an interface such as shown in FIG. 5A with any number of serial links.

SERDES slice 510 of Device A includes transmitter SERDES0 TXA and receiver SERDES0 RXA, SERDES slice 514 includes transmitter SERDES1 TXA and receiver SERDES1 RXA, and SERDES slice 518 includes transmitter SERDES2 TXA and receiver SERDES 2 RXA. Similarly, in Device B, SERDES slice 512 includes transmitter SERDES0 TXB and receiver SERDES0 RXB, SERDES slice 516 includes transmitter SERDES1 TXB and receiver SERDES1 RXB, and SERDES slice 520 includes transmitter SERDES2 TXB and receiver SERDES2 RXB. Each of the SERDES slices sends and receives serial data. In the example embodiment, an interface may be configured by coupling the receivers and transmitters of the SERDES slices of Device A to the receivers and transmitters of the SERDES slices of Device B. Each of Device A and Device B also includes a back channel layer implemented as a back channel bus that is shown In FIG. 5A in each device as back channel bus 506 and back channel bus 508, respectively. According to the example embodiment, the back channel buses 506 and 508 may be configured to provide feedback channels for use in a back channel protocol mechanism for tuning the transmitters of the interface.

According to the example embodiment, the back channel buses 506 and 508 allow Device A and Device B to be configured with no constraints against using split lane swap connections across the interface 500. Each feedback channel may be configured after routing is completed and the interconnections between Devices A and B are known. In response to the requirements of a back channel protocol tuning process, the appropriate feedback channel connections can be configured.

For example, in FIG. 5A, for slice 510, SERDES0 TXA transmits serial data to SERDES0 RXB on link 522 and SERDES0 RXA receives serial data from SERDES1 TXB on link 526. For slice 514 SERDES1 TXA transmits serial data to SERDES2 RXB on link 528 and SERDES1 RXA receives serial data from SERDES0 TXB on link 524. For Slice 518 SERDES2 TXA transmits serial data to SERDES1 RXB on link 530 and SERDES2 RXA receives serial data from SERDES2 TXB on link 532. For Device A, it can be seen that slice 510 is transmitting to slice 512 and receiving from a different slice 516 of Device B. Also, slice 514 on Device A is transmitting to slice 520 and receiving from a different slice 512 of Device B and slice 518 on Device A is transmitting to slice 516 and receiving from a different slice 520 of Device B. In the example of FIG. 5A, there are then split lane swap connections for each slice in Device A.

In the example embodiment of FIG. 5A, the transmitter tuning process requires exchange of information. For example, in the equalization tuning process for SERDES0 TXA in slice 510, SERDES0 TXA transmits a training frame that is a fixed length structure that is sent continuously during training. In response, SERDES0 RXB should send commands back to SERDES0 TXA to adjust its certain transmission parameters. For example, SERDES0 RXB may need to tell SERDES0 TXA to increment, decrement or not change certain equalization parameters for the training frame transmission. SERDES0 TXA responds to the commands with status messages that may for example, indicate to SERDES0 RXB the transmitter can still adjust certain parameters, that the transmitter has reached a high limit for certain parameter, or has reached a low limit for certain parameters. The training frame transmission and feedback is used to tune SERDES0 TXA and the other transmitters in each slice of FIG. 5A. The conventional SERDES device that provides a feedback channel only between a receiver and a transmitter within the same slice of a SERDES device would not function to allow tuning in the example embodiment of interface 500 of FIG. 5A having split lane swaps. The example implementations of Device A and Device B in interface 500 according to the embodiments of the disclosure allow the implementation of interface 500 including split lane swaps.

Back channel bus interface 506 of Device A may be configured to selectively allow the required exchange of information and messages for the transmitter tuning process between the transmitters and receivers of Device A. For example, the back channel bus interface 506 may be configured in a daisy chained back channel bus implementation that allows messages to get from a receiver of Device A to a transmitter of Device A. The daisy chain configuration of back channel bus 506 may include a back channel bus interface layer 534 that interfaces the back channel bus to SERDES slice 510, a back channel bus interface layer 536 that interfaces the back channel bus to SERDES slice 514 and a back channel bus interface layer 538 that interfaces the back channel bus to SERDES slice 518. Similarly, back channel bus interface 508 of Device B may be configured to allow the required exchange of information and messages for the transmitter tuning process for each of the transmitters and receivers of Device B. For example, the back channel bus interface 506 may be configured in a daisy chained back channel bus implementation that allows messages to get from a receiver of Device B to a transmitter of Device B. The daisy chain configuration of back channel bus 508 may include a back channel bus interface layer 540 that interfaces the back channel bus to SERDES slice 512, a back channel bus interface layer 542 that interfaces the back channel bus to SERDES slice 516 and a back channel bus interface layer 544 that interfaces the back channel bus to SERDES slice 520.

In the example implementation the daisy chain back channel bus interface of FIG. 5A, each back channel bus interface layer is assigned a configurable Lane ID before the port is brought up. Each interface layer is also assigned a Recipient Lane ID. The Lane ID and Recipient Lane ID are then associated with the slice that the back channel bus interface connects to the back channel bus. For Example, interface layer 534 of Device A would be assigned a Lane ID and a Recipient ID and the Lane ID and Recipient ID assigned to layer 534 would be associated with slice 510. Similarly, interface layer 536 would be assigned a Lane ID and a Recipient Lane ID which would be associated with slice 514 and interface layer 538 would be assigned a Lane ID and a Recipient Lane ID which would be associated with slice 518. Lane IDs and Recipient Lane IDs may also be assigned to the interface layers of Device B in a similar manner. The daisy chain back channel buses 506 and 508 may be implemented in a combination of hardware and software functioning in each SERDES Device 504 and 506, respectively. In the embodiment of interface 500 of FIG. 5A, the configurations of back channel bus 506 and back channel bus 508 may be implemented so that messages only need to move between the slices of one of Device A or Device B to create the required paths for command message flow. In other words, with the appropriate configuration of the back channel bus 506 of Device A, the back channel bus of Device B may be configured so that messages are sent from each receiver of a slice of Device B only to the transmitter in that same slice. This can be done by having the Lane ID assigned to each slice the same as the Recipient Lane ID assigned to the slice. In alternative embodiments, for example, this would require that only Device A have the back channel bus configuration implemented and Device B could be implemented as a conventional SEREDES device.

The Lane IDs and Recipient lane IDs may be programmed into the daisy chain backchannel bus before the port in which the devices are included is brought up, but after determination of the interface connections between Device A and Device B. The Lane ID and Recipient Lane ID are configured to provide the appropriate feedback paths for transmitter tuning based on the connections between Device A and Device B on interface 500. In the tuning process of transmitter SERDES0 TXA, SERDES0 RXB in Device B receives a training pattern over link 522 from SERDES0 TXA. Based on the received training pattern, SERDES0 RXB will return command messages to SERDES0 TXA by sending the messages through the back channel bus 508 to SERDES0 TXB, which transmits the messages over link 524. In the embodiment of FIG. 5A, since SERDES0 RXB is sending the message to SERDES0 TXB which is within its own slice, interface layer 540 determines the recipient Lane ID is the same as its own Lane ID and sends the message to SERDES0 TXB. SERDES0 TXB then transmits the command messages over link 524 to SERDES1 RXA. The command messages are received by SERDES1 RXA on link 524. SERDES1 RXA then sends the command messages to interface layer 536. Since the message originates on the interface bus at slice 514, which is the slice associated with interface layer 536, interface layer 536 inserts a Recipient Lane ID, which would be the Lane ID of slice 510, in the command message and sends the message on the back channel bus 506. The command message then moves on the back channel bus to interface layer 538. Interface layer 538 looks at the Recipient Lane ID in the command message and determine the message is not directed to slice 518 but should be forwarded further on back channel bus 506. The command message then moves to interface layer 534 and Interface 534 looks at the Recipient Lane ID. Interface layer 534 determines that the Recipient Lane ID matches the Lane ID of slice 510, which contains the command message recipient SERDES0 TXA. Interface layer 534 then sends the command message to SERDES0 TXA. SERDES0 TXA can then transmit status messages in response to the command messages received from SERDES0 RXB and the tuning process can be performed for SERDES0 RXA.

The back channel interface bus 506 may also be used to carry command messages that SERDES1 RXA should send to SERDES0 TXB in the tuning process of SERDES0 TXB, which is the transmitter SEREDES1 RXA is receiving from on the interface 500. In this case SERDES1 RXA sends the command messages intended for SERDES0 TXB to interface layer 536. Since the command message originates on the interface bus at slice 514, which is the slice associated with interface layer 536, interface layer 536 inserts a Recipient Lane ID, which would be the Lane ID of slice 510, in the command message and sends the message on the back channel bus 506. The command message then moves on the back channel bus to interface layer 538. Interface layer 538 looks at the Recipient Lane ID in the command message and determine the message is not directed to slice 518 but should be forwarded further on back channel bus 506. The command message then moves to interface layer 534 and Interface 534 looks at the Recipient Lane ID. Interface layer 534 determines that the Recipient Lane ID matches the Lane ID of slice 510. Interface layer 534 then sends the command message slice to 510 and the message is sent by SERDES0 TXA over link 522 to SERDES0 RXB. The massage is then passed within slice 512 to SERDES0 TXB.SERDES TXB can then adjust its transmission parameters and transmit status messages in response to the command messages received from SERDES1 RXA and the tuning process can be performed for SERDES0 TXB.

Referring now to FIG. 5B, therein is illustrated a simplified flow diagram illustrating example operations that may be associated a SERDES interface in accordance with the embodiment of FIG. 5A. The example operations of FIG. 5B may be executed upon initialization of the interface port with which device A is associated, and after the connections between the slices of Device A and Device B are configured. FIG. 5B illustrates an example process that applies to each of the individual slices in Device in FIG. 5A. The process begins at 552 where a slice and interface layer associated with the slice is assigned a Lane ID. The Lane ID identifies the slice itself. Then, at 554 a Recipient Lane ID is assigned to the slice and interface layer based on the connections that are configured between Device A and in Device B. The Recipient ID identifies the slice that messages sent from the slice assigned the Recipient ID are to be sent to on the bus. For example, in the example embodiment of FIG. 5A, slice 514 would be assigned a Recipient ID that was matched with the Lane ID of slice 510. The assignments of the Lane IDs and Recipient Lane IDs for each slice may be allocated so that messages sent on the back channel interface 506 will reach the appropriate destination slice and transmitter for each message in the transmitter tuning process as described previously for FIG. 5A.

The process then moves to 558 where, after the system input/output ports are brought up and during operation of the interface 500, an interface layer of a slice receives a message on the back channel bus. At 558, if the message originated within the slice associated with the interface layer, the process moves to 560 and the interface layer inserts the Recipient ID assigned to the interface layer and slice into the message and sends the message on the back channel interface where it is directed to its recipient. Otherwise, the message has been received on the back channel bus from another slice and the process moves from 558 to 562 and the interface layer determines if the Recipient ID in the received message received on the back channel bus is the same as the Lane ID assigned to the interface layer and its associated slice. If it is determined, at 562, that the Recipient ID is not the same as the Lane ID assigned to the interface layer and it associated slice, the process moves to 564 and the message is forwarded onward on the back channel bus. If, however, at 562 it is determined that the Recipient ID in the message is the same as the Lane ID assigned to the interface layer and its associated slice, the process moves to 566 and the interface layer receives the message for its associated slice. The process then returns to 556 where other messages received at the interface layer are processed in the same manner.

Figure 5C:
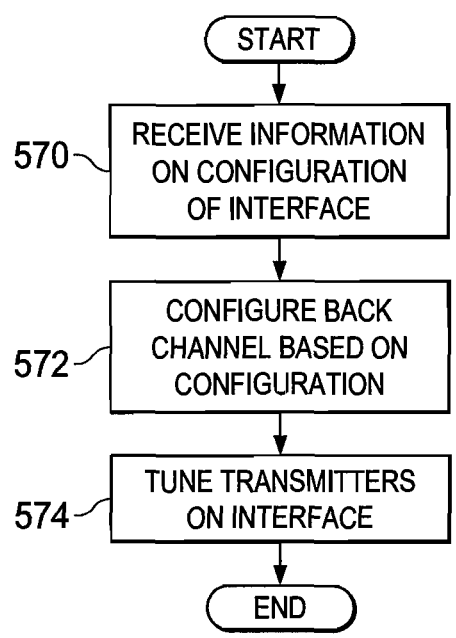
FIG. 5C is a simplified flow diagram illustrating example operations that may be associated a channel interface layer in accordance with a further embodiment of the disclosure.

Referring now to FIG. 5C, therein is illustrated a simplified flow diagram illustrating example operations that may be associated a SERDES interface in accordance with the example embodiments of the disclosure. FIG. 5C shows generally how the example embodiments may be utilized within a system such the embodiment of system 300 in FIG. 3 that utilizes SERDES devices on serial interfaces having split lane swap connections. At operation 570, information about the routing configuration of an interface is received at a SERDES device at which the interface is implemented. Process operation 570 may be implemented, for example, in processing circuitry controlling a SERDES device such as SERDES 200 of FIG. 2. Next, at 572 the back channel of the SERDES device is configured based on the routing configuration of the interface. The process operation 572 may be implemented, for example, by the programming of a mapping layer implemented as mapping layer 406 of in SERDES Device A FIGS. 4A and 4B, or, in an alternative embodiment, by the programming and assigning of the Lane IDs and Recipient IDs for a back channel bus implemented as daisy chain bus 506 of SERDES Device A of FIG. 5A, where the programming may be performed by the processing circuitry of the SERDES device. Next, at 574, the transmitters of the SERDES device are tuned according to a back-channel protocol. This may be done for example, according to the 802.3ap back channel test pattern procedure.

While this disclosure has illustrated the method and apparatus according to example embodiments, the disclosed embodiments are not meant to be construed as limiting and the various aspects of the disclosure may be implemented in any other form or manner that accomplishes the purposes of the disclosure.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the embodiments may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. Moreover, although the example embodiments have been illustrated with reference to particular elements and operations that facilitate the communication process, these elements, and operations may be replaced by any suitable architecture or process that achieves the intended functionality of example embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    determining information for a configuration of an interface of a first crossbar switch including a plurality of serializer/deserializer (SERDES) slices having a plurality of connections to a second crossbar switch over the interface;
    configuring a back channel layer associated with the first crossbar switch to form a back channel path to carry a first message to a first transmitter from a first receiver of the first crossbar switch based on a configuration of the plurality of connections to the second crossbar switch, wherein the first transmitter is in a first SERDES slice of the plurality of SERDES slices, and the first SERDES slice is assigned a lane ID;
    receiving, at the first receiver, a second message on a serial link, wherein the first receiver is in a second SERDES slice of the plurality of SERDES slices, and the back channel layer inserts a recipient ID in the second message to produce the first message; and
    determining, with an interface layer, whether the recipient ID in the first message matches the lane ID, wherein the interface layer interfaces to the first SERDES slice.

2. The method of claim 1, further comprising:
    tuning the first transmitter by receiving a command forwarded from the first receiver over the back channel path.

3. The method of claim 1, wherein the first transmitter and the first receiver are coupled to a second receiver and a second transmitter, respectively, over the interface, the second receiver and the second transmitter being in a same SERDES slice of the second crossbar switch, and the method further comprises:
    receiving a message sent by the second transmitter over the interface at the first receiver, wherein the message sent by the second transmitter comprises a command message generated by the second receiver.

4. The method of claim 1, wherein the configuring comprises configuring a back channel mapping layer to form the back channel path to carry messages between the first transmitter and the first receiver.

5. The method of claim 1, wherein the configuring comprises configuring a back channel bus by assigning the recipient ID to the second SERDES slice, and the recipient ID identifies the first SERDES slice.

6. The method of claim 1, wherein the configuring comprises configuring a daisy chain back channel bus.

7. An apparatus, comprising:
- a first slice of a plurality of serializer/deserializer (SERDES) slices, wherein the first slice includes a first transmitter, and the first slice is assigned a lane ID;
- an interface layer that interfaces to the first slice, wherein the interface layer is configured to determine whether a recipient ID in a first message matches the lane ID;
- a second slice of the plurality of SERDES slices, wherein the second slice includes a first receiver configured to receive a second message on a serial link; and
- a back channel layer configured to insert the recipient ID in the second message to produce the first message and to form a back channel path to carry the first message from the first receiver to the first transmitter.

8. The apparatus of claim 7, wherein the back channel layer comprises a mapping layer.

9. The apparatus of claim 8, wherein the mapping layer comprises a programmable multiplexing layer.

10. The apparatus of claim 7, wherein the back channel layer comprises a daisy chain back channel bus.

11. The apparatus of claim 10, wherein the daisy chain back channel bus comprises a plurality of interface layers coupled together in a daisy chain configuration, and each of the plurality of interface layers is coupled to a corresponding SERDES slice of the plurality of SERDES slices.

12. The apparatus of claim 11, wherein each of the plurality of interface layers and the second slice are associated with a lane ID and a recipient ID.

13. The apparatus of claim 7, wherein the apparatus comprises a first SERDES device and a second SERDES device, and the first transmitter and the first receiver are coupled to a second receiver and a second transmitter, respectively, of the second SERDES device over an interface, the second receiver and the second transmitter being in a same SERDES slice of the second SERDES device.

14. The apparatus of claim 13, wherein the second message comprises a command message from the second receiver directed to the first transmitter.

15. The apparatus of claim 7, wherein the apparatus is further configured to:
- determine information for a configuration of an interface, wherein the plurality of SERDES slices have a plurality of connections to a SERDES device over the interface; and
- configure the back channel layer based on a configuration of the plurality of connections to the SERDES device.

16. Non-transitory media encoded with logic that includes instructions for execution and, when executed by a processor, is operable to perform operations comprising:
- determining information for a configuration of an interface of a first crossbar switch including a plurality of serializer/deserializer (SERDES) slices having a plurality of connections to a second crossbar switch over the interface;
- configuring a back channel layer of the first crossbar switch to form a back channel path to carry a first message to a transmitter from a receiver of the first crossbar switch based on a configuration of the plurality of connections to the second crossbar switch, wherein the transmitter is in a first SERDES slice of the plurality of SERDES slices, and the first SERDES slice is assigned a lane ID;
- receiving, at the receiver, a second message on a serial link, wherein the receiver is in a second SERDES slice of the plurality of SERDES slices, and the back channel layer inserts a recipient ID in the second message to produce the first message; and
- determining, with an interface layer, whether the recipient ID in the first message matches the lane ID, wherein the interface layer interfaces to the first SERDES slice.

17. The media of claim 16, wherein the operations further comprise:
- configuring a back channel mapping layer to form the back channel path to carry messages between the transmitter and the receiver.

18. The media of claim 16, wherein the operations further comprise:
- configuring a back channel bus and assigning a recipient ID to the second SERDES slice, wherein the recipient ID identifies the first SERDES slice.

19. The method of claim 1, wherein the second crossbar switch comprises at least one SERDES slice comprising a second transmitter and a second receiver, the information indicating that the first transmitter and the first receiver are coupled to the second receiver and the second transmitter, respectively, over the interface.

20. The apparatus of claim 7, wherein the first transmitter is tuned by receiving a command in the second message forwarded from the first receiver over the back channel path.

* * * * *